US011972758B2

(12) United States Patent
Ambavat et al.

(10) Patent No.: US 11,972,758 B2
(45) Date of Patent: Apr. 30, 2024

(54) ENHANCING ASR SYSTEM PERFORMANCE FOR AGGLUTINATIVE LANGUAGES

(71) Applicant: Microsoft Technology Licensing, LLC, Redmond, WA (US)

(72) Inventors: Rahul Ambavat, Pali (IN); Ankur Gupta, Hyderabad (IN); Rupeshkumar Rasiklal Mehta, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 386 days.

(21) Appl. No.: 17/488,661

(22) Filed: Sep. 29, 2021

(65) Prior Publication Data

US 2023/0102338 A1 Mar. 30, 2023

(51) Int. Cl.
*G10L 15/187* (2013.01)
*G06N 20/00* (2019.01)
*G10L 15/01* (2013.01)
*G10L 15/04* (2013.01)
*G10L 15/06* (2013.01)

(52) U.S. Cl.
CPC ............ *G10L 15/187* (2013.01); *G06N 20/00* (2019.01); *G10L 15/01* (2013.01); *G10L 15/04* (2013.01); *G10L 15/063* (2013.01)

(58) Field of Classification Search
None
See application file for complete search history.

(56) References Cited

U.S. PATENT DOCUMENTS

| | | | |
|---|---|---|---|
| 9,292,489 B1* | 3/2016 | Sak | G10L 15/26 |
| 9,741,339 B2 | 8/2017 | Peng et al. | |
| 11,587,569 B2 | 2/2023 | Ye et al. | |
| 2015/0006178 A1 | 1/2015 | Peng et al. | |
| 2015/0254233 A1 | 9/2015 | Artz et al. | |
| 2019/0318742 A1* | 10/2019 | Srivastava | G10L 15/32 |
| 2020/0160836 A1* | 5/2020 | Chen | G10L 15/063 |
| 2023/0094511 A1* | 3/2023 | Guha | G10L 15/06 |
| | | | 704/231 |

(Continued)

OTHER PUBLICATIONS

Joshi, et al., "Design and Evaluation of Devanagari Virtual Keyboards for Touch Screen Mobile Phones," in Proceedings of the 13th International Conference on Human Computer Interaction with Mobile Devices and Services, Aug. 2011, pp. 323-332.

(Continued)

*Primary Examiner* — Nafiz E Hoque

(57) ABSTRACT

A training-stage technique trains a language model for use in an ASR system. The technique includes: obtaining a training corpus that includes a sequence of terms; determining that an original term in the training corpus is not present in a dictionary resource; segmenting the original term into two or more sub-terms using a segmentation resource; determining that the segmentation of the original term into the two or more sub-terms is a valid segmentation, based on two or more validity tests; and training the language model based on the terms that have been identified. A computer-implemented inference-stage technique applies the language model to produce ASR output results. The inference-stage technique merges a sub-term with a preceding term if these two terms are separated by no more than a prescribed interval of time.

20 Claims, 8 Drawing Sheets

(56) References Cited

U.S. PATENT DOCUMENTS

2023/0274730 A1    8/2023   Fantinuoli

OTHER PUBLICATIONS

Shah, et al., "Cross-lingual and Multilingual Spoken Term Detection for Low-resource Indian Languages," arXiv e-print, arXiv:2011.06226v1 [cs.CL], Nov. 12, 2020, 5 pages.
Ameta, et al., "A Lightweight Stemmer for Gujarati," arXiv e-print, arXiv:1210.5486v2 [cs.CL], Nov. 11, 2012, 4 pages.
Hasan, et al., "Spelling Correction of User Search Queries Through Statistical Machine Translation," in Proceedings of the 2015 Conference on Empirical Methods in Natural Language Processing, Sep. 2015, pp. 451-460.
Wilbur, et al., "Spelling Correction in the Submed Search Engine," in Information Retrieval, vol. 9, No. 5, Nov. 2006, 31 pages.
Ahmad, et al., "Learning a Spelling Error Model from Search Query Logs," in Proceedings of the Conference on Human Language Technology and Empirical Methods in Natural Language Processing, HLT '05, Oct. 2015, pp. 955-962.
Etoori, et al., "Automatic Spelling Correction for Resource-scarce Languages Using Deep Learning," in Proceedings of ACL 2018, Student Research Workshop, Jul. 2018, pp. 146-152.
Chaudhuri, Bidyut Baran, "Towards Indian Language Spell-checker Design," in Proceedings of Language Engineering Conference, 2002, 8 pages.
Dixit, et al., "Design and implementation of a morphology-based Spellchecker for Marathi, an Indian Language," in Archives of Control Sciences, vol. 15, 2005, pp. 251-258.
Rao, et al., "Telugu Spell Checker," available at http://sanskrit.uohyd.ac.in/faculty/amba/PUBLICATIONS/papers/ITIC-ss.pdf, Center for Applied Linguistics and Translation Studies at University of Hyderabad, 2012, accessed on Oct. 6, 2021, 8 pages.
Sharma, et al., "Hindi Spell Checker," available at https://cse.iitk.ac.in/users/cs365/2013/submissions/~pulkitj/cs365/project/report.pdf, Indian Institute of Technology Kanpur, Apr. 17, 2013, 7 pages.
Kaur, et al., "Design and Implementation of Hinspell—Hindi Spell Checker using Hybrid Approach," in International Journal of Scientific Research and Management (IJSRM), vol. 3, No. 2, pp. 2058-2061.
Emond, et al., "Transliteration Based Approaches to Improve Code-switched Speech Recognition Performance," in IEEE Spoken Language Technology Workshop (SLT), 2018, 8 pages.
Singh, et al., "Automatic Normalization of Word Variations in Code-Mixed Social Media Text," arXiv e-prints, arXiv:1804.00804v1 [cs.CL], Apr. 2018, 11 pages.
Pandey, et al., "Improving Speech Recognition of Compound-rich Languages," in Proceedings of Interspeech, Oct. 2020, 5 pages.
Smit, et al., "Improved subword modeling for WFST-based speech recognition," in Proceedings of Interspeech, 2017, pp. 2551-2555.
"Byte pair encoding," available at https://en.wikipedia.org/wiki/Byte_pair_encoding, Wikipedia entry, accessed on Aug. 26, 2021, 2 pages.
Creutz, et al., "Unsupervised Discovery of Morphemes," in Morphological and Phonological Learning: Proceedings of the 6th Workshop of the ACL Special Interest Group in Computational Phonology (SIGPHON), Association for Computational Linguistics, Jul. 2002, pp. 21-30.
Smit, et al., "Morfessor 2.0: Toolkit for statistical morphological segmentation," in Proceedings of the Demonstrations at the 14th Conference of the European Chapter of the Association for Computational Linguistics, Association for Computational Linguistics, Apr. 2014, pp. 21-24.
Wu, et al., "Google's Neural Machine Translation System: Bridging the Gap between Human and Machine Translation," arXiv:1609.08144v2 [cs.CL], Oct. 8, 2016, 23 pages.
"Gujrati Grammar," available at https://en.wikipedia.org/wiki/Gujarati_grammar, Wikipedia entry, accessed on Aug. 23, 2021, 9 pages.
"Schwa," available at https://en.wikipedia.org/wiki/Schwa, Wikipedia entry, accessed on Aug. 23, 2021, 8 pages.
Huang, et al., "An Overview of Modern Speech Recognition," available at https://www.microsoft.com/en-us/research/publication/an-overview-of-modern-speech-recognition/, in Handbook of Natural Language Processing, 2nd Edition, 2010, Chapman and Hall/CRC, Chapter 15, 29 pages.
Kudo, et al., "SentencePiece: A simple and language independent subword tokenizer and detokenizer for Neural Text Processing," arXiv:1808.06226v1 [cs.CL], Aug. 19, 2018, 6 pages.
Sennrich, et al., "Neural Machine Translation of Rare Words with Subword Units," arXiv:1508.07909v5 [cs.CL], Jun. 10, 2016, 11 pages.
"Microsoft Translator," available at https://en.wikipedia.org/wiki/Microsoft_Translator, Wikipedia entry, accessed on Sep. 30, 10 pages.
Guha, et al., "Developing an Automatic Speech Recognition System Using Normalization," U.S. Appl. No. 17/488,695, filed Sep. 29, 2021, 61 pages.
O'Shaughnessy, Douglas, "Interacting with Computers by Voice: Automatic Speech Recognition and Synthesis," in Proceedings of the IEEE, vol. 91, No. 9, Sep. 2003, pp. 1272-1305.
O'Shaughnessy, Douglas, "Automatic Speech Recognition," in Speech Communications: Human and Machine, IEEE, Chapter 10, 2000, pp. 367-435.
Office Action in U.S. Appl. No. 17/488,695, dated Oct. 26, 2023, 11 pages.
Guha, et al., "Unsupervised Language-agnostic WER Standardization," arXiv, arXiv:2303.05046v1 [cs.CL], Mar. 9, 2023, 5 pages.

* cited by examiner

US 11,972,758 B2

ENHANCING ASR SYSTEM PERFORMANCE FOR AGGLUTINATIVE LANGUAGES

BACKGROUND

Automatic speech recognition (ASR) systems may produce uneven results for natural languages that are highly agglutinative in nature. An agglutinative language is a natural language in which many words are compound words, each of which is composed by combining plural word parts. The Indian languages of Gujarati and Marathi, for instance, are both highly agglutinative in nature. An ASR system may encounter problems when it receives a compound word in an agglutinative language because its language model may fail to recognize it. In addition, or alternatively, the ASR system may fail to formulate and present its interpretation of the compound word in the most appropriate way.

SUMMARY

A computer-implemented training-stage technique is described herein for training a language model for use in an ASR system. The method includes: obtaining a training corpus that includes a sequence of terms; determining that an original term in the training corpus is not present in a dictionary resource; segmenting the original term into two or more sub-terms using a segmentation resource; determining that the segmentation of the original term into the two or more sub-terms is a valid segmentation, based on two or more validity tests; and training the language model based on at least the sub-terms that have been identified (along with any original terms that have been added to the dictionary resource, without segmentation).

According to some implementations, one validity test involves: determining a pronunciation of the original term using a pronunciation resource; determining pronunciations of an original term's sub-terms using the pronunciation resource; and determining that the segmentation is valid if the pronunciation of the original term matches the combined (e.g., concatenated) pronunciations of its sub-terms.

According to some implementations, another validity test involves determining that the segmentation is valid based on at least one language-specific rule.

The above-described training-stage technique is efficient because it does not require a developer to manually create a labeled training corpus. Rather, the training-stage technique adopts a supervision-by-proxy approach because it relies on signals provided by other machine-trained models (e.g., provided by the pronunciation resource) to decide whether segmentations are valid. (Note however, that other implementations can use one or more custom machine-trained models.) At least parts of the training-stage technique are also scalable because they can be used for any natural language.

The language model produced by the training-stage technique is itself resource-efficient because it need not include an entry that explicitly accounts for every compound word that can be formulated in an agglutinative language (which would be a very large number of words). This reduces the amount of memory that is necessary to store the language model, and the amount of processing resources that are required to operate on the language model. At the same time, the language model is trained based on segmentations of compound words that are explicitly validated as being correct. This provision reduces the chances that the ASR system will incorrectly interpret a user's input utterance A computer-implemented inference-stage technique for applying the language model is also described herein. The inference-stage technique includes: obtaining an input utterance; generating preliminary ASR output results that include at least a first particular term followed by a second particular term; in a merge test, determining that the second particular term occurs within a prescribed interval of time following the first particular term; and in response to determining that the merge test is satisfied, merging the first particular term with the second particular term, to produce inference-stage ASR output results. The above-identified inference-stage technique can correctly present each compound term as an integrated whole, assuming that the merge test is met, rather than presenting the sub-terms that compose the compound term as separated parts.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing system for producing a language model for use by a speech recognition (ASR) system. Section A also describes the inference-stage operation of the ASR system. Section B sets forth illustrative methods which explain the operation of the computing system of Section A. And Section C describes illustrative computing functionality that can be used to implement any aspect of the features described in Sections A and B.

A. Illustrative Computing System

A compound term is formed by combining plural sub-terms. For example, in the English language, the word doorknob is formed by combining the word "door" and "knob." An agglutinative language is language that makes heavy use of compound words. Indian languages, such as Gujarati and Marathi, may be considered highly agglutinative languages. More specifically, in Indian languages, many words are formed by adding postfix (suffix) terms to preceding nouns. More generally, as used herein, "term" and "word" are used interchangeably. A "term" (or "word") denotes any string of textual characters of any length.

Figure 1:
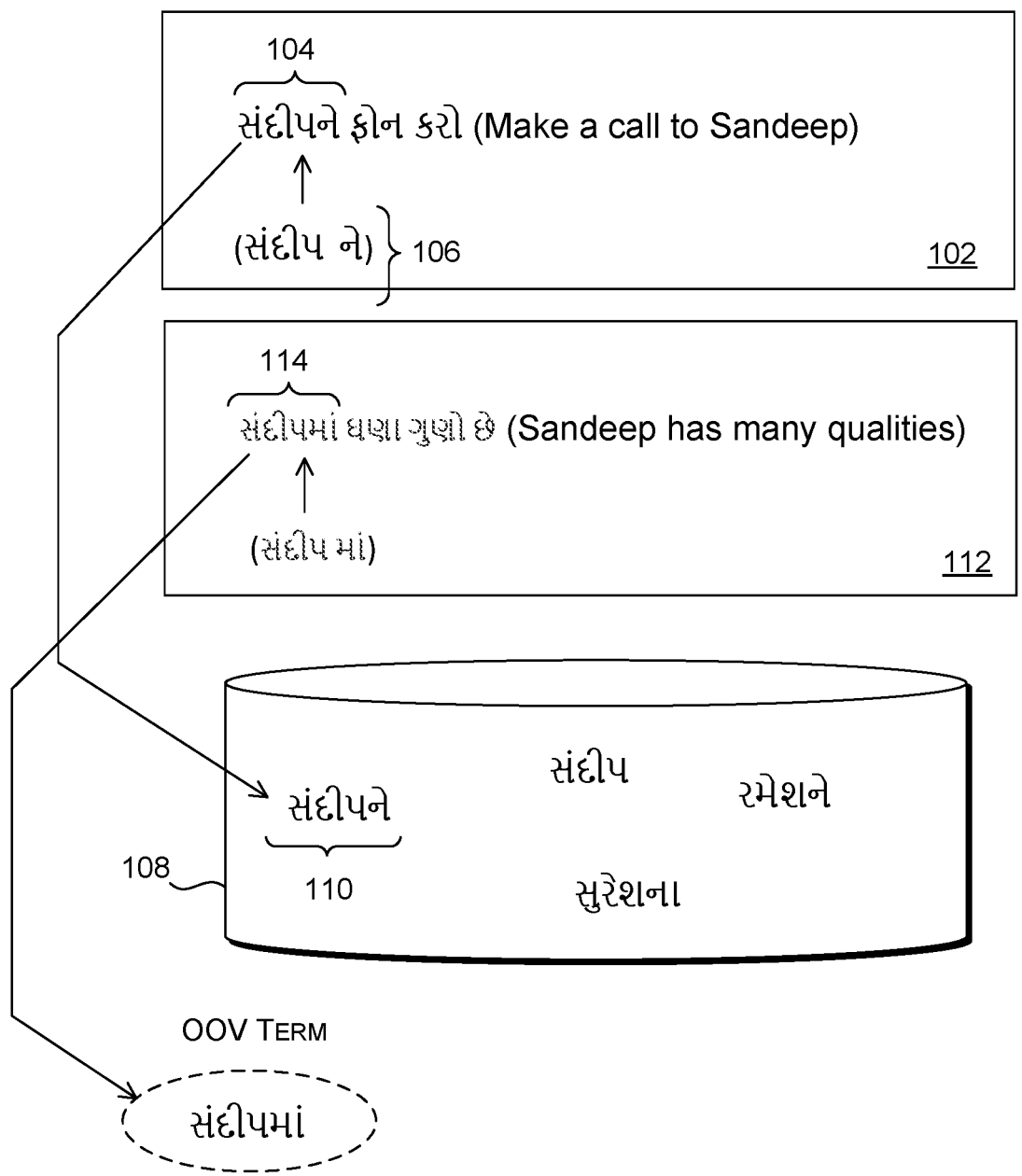
FIG. 1 demonstrates the concept of out of-vocabulary (OOV) terms caused by the use of compound terms in an agglutinative language.

FIG. 1 explains the concept of out-of-vocabulary (OOV) terms in the context of processing compound terms. A first example 102 includes a compound term 104 that is composed of two sub-terms 106. Assume that a dictionary resource 108 associated with a language model (not shown) includes a dictionary entry 110 for the compound term 104. This means that the compound term 104 may be considered an in-vocabulary term. In contrast, a second example 112 includes a compound term 114 that has no counterpart entry in the dictionary resource 108. This means that the compound term 114 is an out-of-vocabulary (OOV) term.

In practice, the language model that is configured to represent an agglutinative language will encounter a large number of OOV terms. This deficiency stems from the fact there are a very large number of valid compound words that can be formed in the agglutinative language. This makes it difficult (or impossible) for the language model to explicitly account for all the permutations that can be expressed in the agglutinative language. Prior to the improvement described herein, a developer may have addressed this situation by capturing a prescribed number of the most common compound words in the language model of the agglutinative language. The language model represents these compound words in "glued" form, e.g., as integral wholes.

In some cases, a sub-term that can be added to another term constitutes a valid self-standing term in its own right. A language model may have been built which accounts for the presence of these kinds of sub-terms, insofar as they have been detected during a training process. But this type of language model will still not accurately account for the probabilities in which the sub-term occurs within a training corpus, because its statistics fail to account for the inclusion of this sub-term within compound terms.

Figure 2:
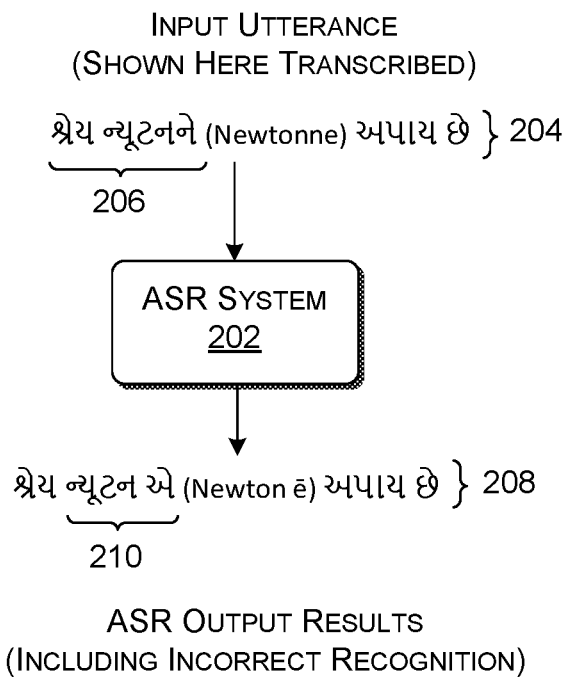
FIGS. 2 and 3 show two problems that may arise when processing compound words using an automatic speech recognition (ASR) system.
Figure 3:
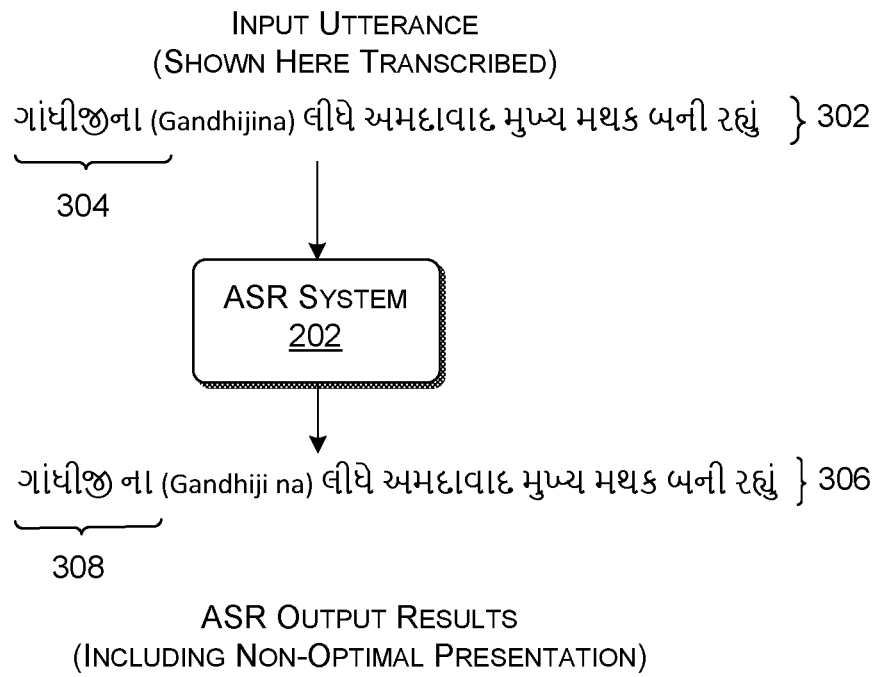

FIGS. 2 and 3 show two problems that may arise when processing compound words using an automatic speech recognition (ASR) system 202. In the first example of FIG. 2, the ASR system 202 receives an input utterance 204 in an Indian language, the transcript of which is shown in FIG. 2. The input utterance 204 includes a compound term 206. The ASR system 202 maps the input utterance 204 to ASR output results 208, which reflects the ASR system's interpretation of the input utterance 204. Assume that the compound term 206 is an OOV term because it is not known to the language model used by the ASR system 202. As a result, the ASR output results 208 includes an ASR term 210 that expresses an incorrect interpretation of the compound term 206 in the input utterance 204.

In the second example of FIG. 3, the ASR system 202 again receives an input utterance 302 in an Indian language, the transcript of which is shown in FIG. 3. The input utterance 302 again includes a compound term 304. The ASR system 202 maps the input utterance 302 to ASR output results 306, which reflects the ASR system's interpretation of the input utterance 302. Assume that the compound term 304 is an OOV term because it is not known to the language model used by the ASR system 202. But nevertheless assume that the language model can form an approximation of the correct interpretation of the compound term 304 based on words that are represented by the language model. As a result, the ASR output results includes an ASR term 308 that expresses the meaning of the compound term 304 in the input utterance 302. But assume that the ASR system 202 fails to present the ASR term in the most optimal manner. For example, the ASR system 202 expresses the ASR term 308 as two parts separated by a blank space, wherein it would be more appropriate if the ASR system 202 expressed the ASR term 308 as a single string (without a blank space).

Figure 4:
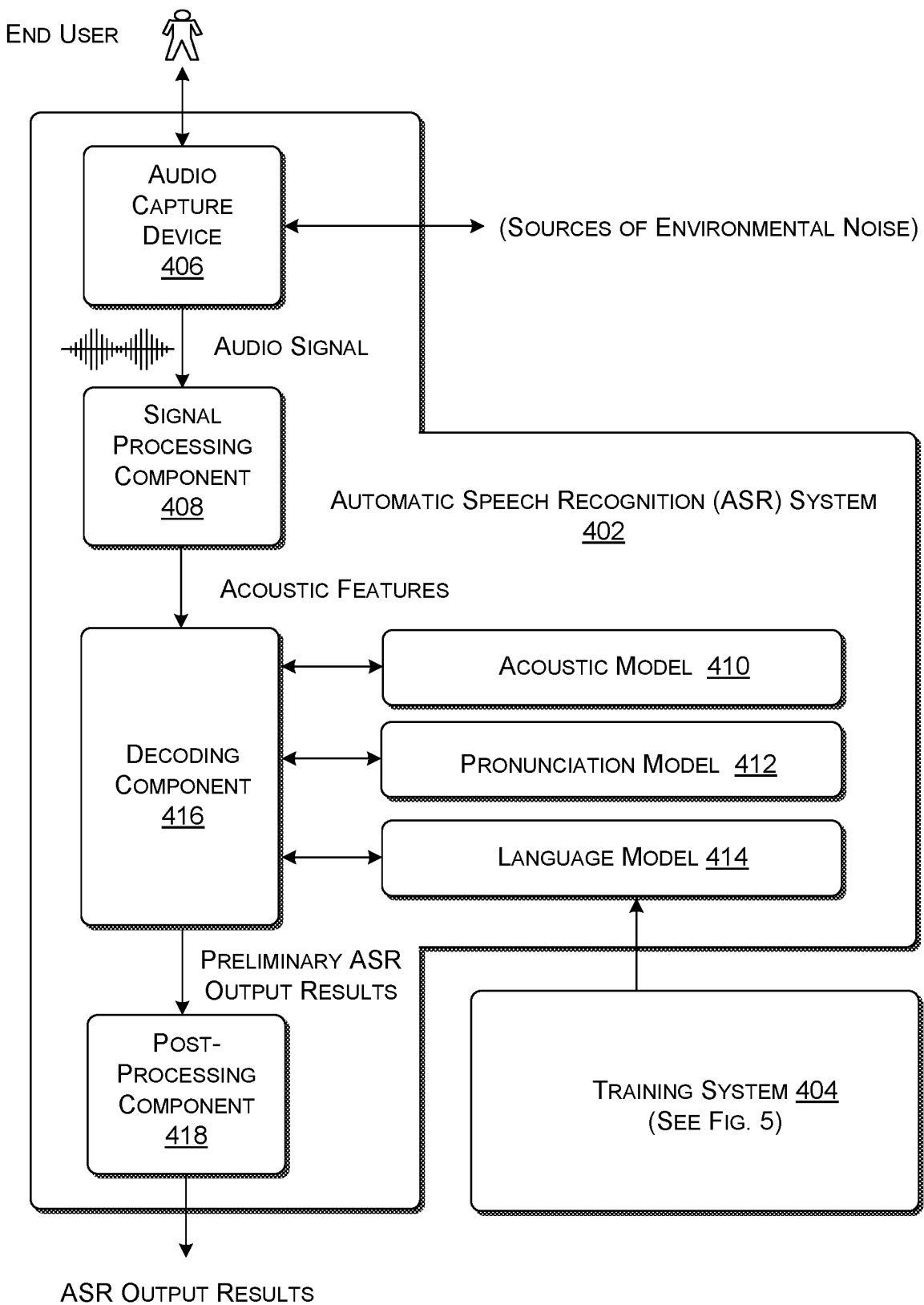
FIG. 4 shows one implementation of the ASR system and a training system.

FIG. 4 shows one implementation of the ASR system 402 and a training system 404. The ASR system 402 is configured to map a user's input utterance into ASR output results. The ASR system 402 may correspond to a standalone resource that maps input utterances into output text. Alternatively, the ASR system 402 may correspond to a component of a larger application, such as a search application, a question-answering service, a Chabot service, a machine translation service, etc. In those embedded contexts, the ASR output results are passed to one or more downstream components (not shown) for further processing, and the ASR output results need not be presented to a user. The training system 404 is configured to train a language model that is used by the ASR system 402. The operation of the ASR system 402 will first be explained in generally top-to-bottom fashion, with emphasis on the parts of the ASR system 402 that are specially adapted for operation on agglutinative languages.

An audio capture device 406 includes one or more microphones for sensing a user's speech waveform, and producing a raw audio signal in response thereto. A signal processing component 408 samples the raw audio signal to produce digital audio data. The signal processing component 408 then converts the digital data into a stream of audio features that characterize the speech, organized into a series of audio frames. For example, the audio features correspond to Mel-frequency cepstral coefficients (MFCCs).

An acoustic model 410 converts the stream of audio features into a stream of phonemes. A phoneme is a unit of sound that makes up part of a word that the user is speaking. Each natural language draws from a predefined vocabulary of such phonemes. In some implementations, the acoustic model 410 performs its mapping function using a statistical machine-trained model, such as a Hidden Markov Model (HMM). A pronunciation model 412 provides information that maps words to the sets of phonemes that make up the respective words. In some implementations, the pronunciation module 412 can implement this mapping information as a dictionary lookup table.

A language model 414 describes the probability of encountering a string of words in a speech utterance, expressed in a particular natural language. In some implementations, the language model 414 is implemented as an n-gram model. For example, a bigram language model describes the probability of encountering a word $w_i$ in a speech utterance, given that the detected occurrence of a preceding word $w_{i-1}$ (e.g., $P(w_i|w_{i-1})$). The probability of a complete sequence of words is found by forming the product of the individual probabilities associated with the words given by the bigram model.

The probabilities defined by the acoustic model 410, the pronunciation model 412, and the language model 414 collectively define a search space. A decoding component 416 searches through the search space to find the interpretation of the user's input utterance that has the highest probability. In some implementations, the decoding component 416 performs its search using the Viterbi algorithm in conjunction with beam search. This approach provides an approximation of the interpretation having the highest interpretation, not necessarily the best possible interpretation. The operation of the Viterbi algorithm can be expressed in mathematical terms as follows:

$$P(W \mid X) = \underset{W}{\mathrm{argmax}} P(X \mid W) P(W). \quad (1)$$

Equation (1) states that the probability of a word sequence W occurring, given a detected occurrence of a string of audio feature vectors X, is formed by searching through probability information given by the acoustic model 410 and the pronunciation model 412 (e.g., $P(X|W)$), together with probability information given by the language model 414 (e.g., $P(W)$).

The above-described description of ASR processing is set forth in the spirit of illustration, not limitation. The improvements described herein can be implemented in the context of other kinds of ASR frameworks. For example, other implementations of the ASR system 402 can use one or more deep neural networks (DNNs) to perform the above-described speech recognition functions. Indeed, in an end-to-end DNN, a single neural network is used to convert a sequence of audio vectors into the ASR output results.

In one implementation, the decoding component 416 produces preliminary ASR output results. In some circumstances, a post-processing component 418 modifies the preliminary ASR output results to improve its form, to produce final ASR output results. For example, as will be described in greater detail below, assume that the preliminary ASR output results include two sub-terms separated by a space. The post-processing component 418 will combine these two sub-terms together if they are separated in time by no more than a prescribed temporal interval.

Figure 5:
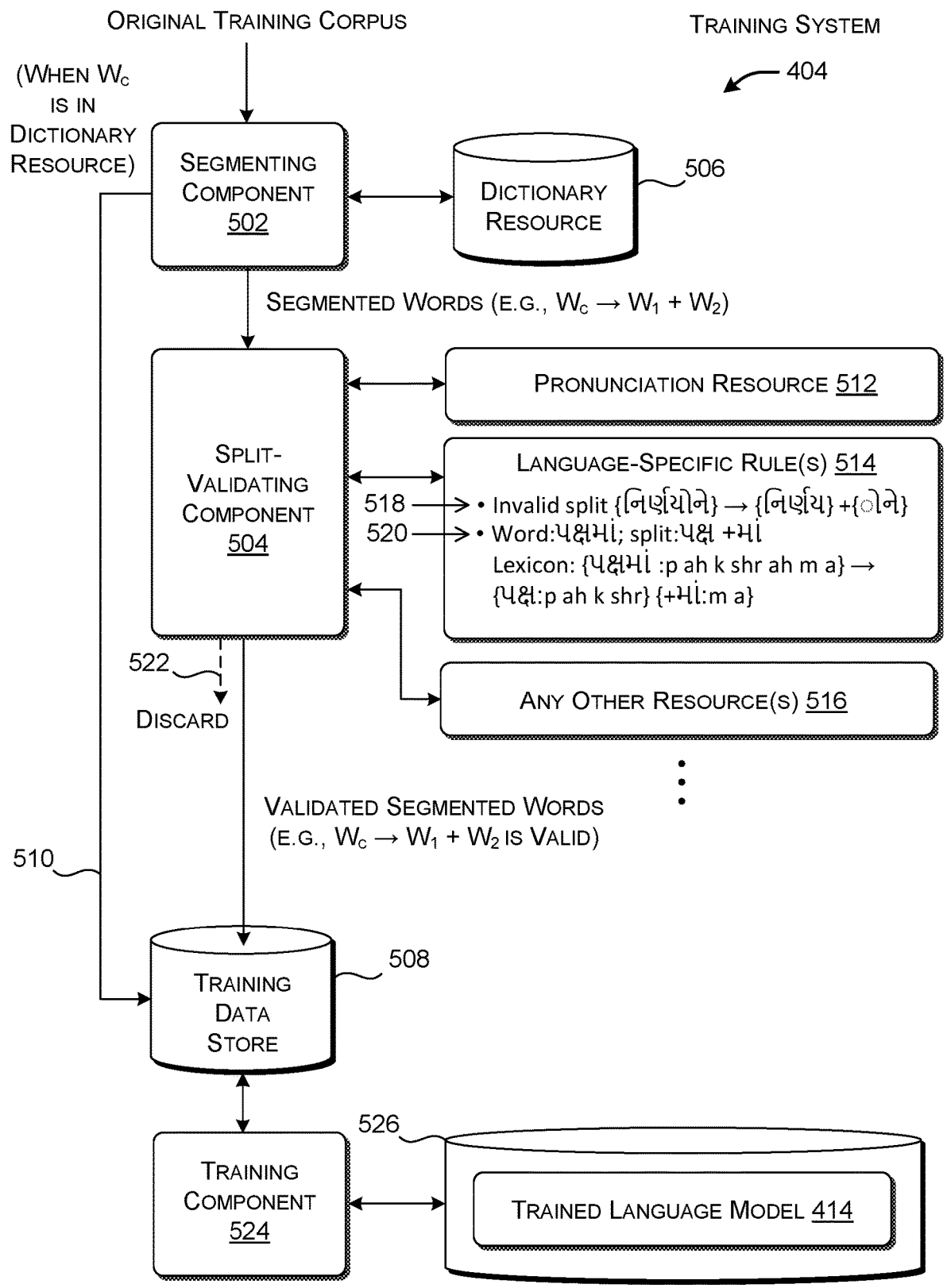
FIG. 5 shows further details of one implementation of the training system of FIG. 4.

Advancing to FIG. 5, this figure shows one implementation of the training system 404 of FIG. 4, the purpose of which is to produce the trained language model 414 used by the ASR system 402. The training system 404 begins by receiving an original training corpus. The original training corpus can correspond to any collection of text of any size, defining a sequence of words. For example, the training corpus may correspond to the sentences that compose one or more books, etc.

A segmenting component 502 performs initial segmentation on the original text corpus, to provide a plurality of candidate segmented terms. For instance, given a compound term $W_C$ in the original text corpus, the segmenting component 502 determines whether it is appropriate to break this compound term into two or more sub-terms (e.g., $W_1$, $W_2$, etc.). If so, the segmenting component 502 outputs information that indicates that the compound word $W_C$ can be decomposed into its identified sub-terms. Note, however, that any conclusion drawn by the segmenting component 502 is preliminary in nature because it has not been verified, which is the function of a split-validating component 504, to be described in greater detail below.

More specifically, the segmenting component 502 processes each candidate term of the original training corpus. For each candidate term, the segmenting component 502 consults a dictionary resource 506 to determine whether it contains a dictionary entry for this candidate term. The dictionary resource 506 may represent the terms captured by the language model 414 in its current state, prior to modification by the training system 404. In a first case, assume that the segmenting component 502 determines that the dictionary resource 506 contains the candidate term under consideration. If so, the segmenting component 502 stores the candidate term in a training data store 508, without segmenting it. This operation is represented in FIG. 5 by the processing path 510. Alternatively, assume that the segmenting component 502 concludes that the candidate term under consideration is not present in the dictionary resource 506. If so, the segmenting component 502 attempts to break it up into its sub-term components.

The segmenting component 502 can use any segmenting tool to segment a candidate term. One such resource is the Morfessor tool, e.g., described in CREUTZ, et al., "Unsupervised Discovery of Morphemes," in Morphological and Phonological Learning: Proceedings of the 6th Workshop of the ACL Special Interest Group in Computational Phonology (SIGPHON), Association for Computational Linguistics, July 2002, pp. 21-30, and SMIT, et al., "Morfessor 2.0: Toolkit for Statistical Morphological Segmentation," in Proceedings of the Demonstrations at the 14th Conference of the European Chapter of the Association for Computational Linguistics, Association for Computational Linguistics, April 2014, pp. 21-24. Another resource is the WordPiece model, e.g., described in WU, et al., "Google's Neural Machine Translation System: Bridging the Gap between Human and Machine Translation," arXiv:1609.08144v2 [cs.CL], Oct. 8, 2016, 23 pages. Another resource is the SentencePiece tool, e.g., described in KUDO, et al., "SentencePiece: A Simple and Language Independent Subword Tokenizer and Detokenizer for Neural Text Processing," arXiv:1808.06226v1 [cs.CL], Aug. 19, 2018, 6 pages. Another resource is the byte-pair-encoding (BPE) tool, e.g., described in SENNRICH, et al., "Neural Machine Translation of Rare Words with Subword Units," arXiv: 1508.07909v5 [cs.CL], Jun. 10, 2016, 11 pages. All of the references cited in this paragraph are incorporated by reference herein.

For example, one implementation of the Morfessor tool breaks up each candidate term in the original training corpus based on a codebook. The codebook describes the permissible sub-terms that can be used to partition each candidate term. In some implementations, the Morfessor tool can iteratively derive the codebook in a prior training process by serially processing the terms that compose a Morfessor training corpus. That is, for each candidate term that is randomly chosen from the Morfessor training corpus, the Morfessor tool attempts to choose a segmentation that will best improve a cost function. One cost function includes a first cost measure that is defined as the negative log likelihood of identified sub-terms in the codebook in its current state, and a second cost measure that depends on the size of the codebook in its current state. More generally stated, the Morfessor tool adopts this cost function to reward the selection of frequently-occurring sub-terms (thus producing a compact representation of the Morfessor training corpus) while economizing the number of sub-terms in the codebook (thus producing a compact codebook). The Morfessor tool terminates the above-described process when a predetermined training objective is achieved, such as a predetermined cost threshold value.

To repeat, however, the use of the Morfessor tool is mentioned here by way of illustration, not limitation. For instance, in another approach, the segmenting component 502 can generate preliminary segmentations based on manually-chosen parsing rules. For example, this approach can rely on a codebook of permitted sub-terms manually chosen by a developer. In another approach, the segmenting component 502 can iteratively derive a codebook of sub-terms by successively growing the sizes of the sub-terms in the codebook using the principles underlying the byte-pass-encoding (BPE) technique, starting with sub-terms having the sizes of single characters, with the objective of optimizing a specified cost function.

If the segmenting component 502 successfully partitions a candidate term under consideration, that candidate word constitutes, by definition, a compound term. For example, assume that the term under consideration is "arrangements." The segmenting component 502 may break this word up into the preliminary sub-terms of "arrange," "ment," and "s." In other cases, the segmenting component 502 may conclude that a candidate term under consideration cannot be segmented. If so, the segmenting component 502 forwards the original candidate term to the training data store 508, without segmenting it.

The split-validating component 504 determines whether each candidate segmentation proposed by the segmenting component is valid. The split-validating component 504 makes this determination, based on plural resources (512, 514, 516, . . . ). The first resource is a pronunciation resource 512. The pronunciation resource 512 identifies the pronunciation of a compound term under consideration, and the pronunciation of each of its constituent sub-terms. In one implementation, the pronunciation resource 512 determines the pronunciation of each input text string by using a machine-trained model to map features that describe the text string into pronunciation information that expresses how the text string should be pronounced. Without limitation, illustrative machine-trained models that can be used to perform this task include a convolutional neural network (CNN), a sequence-to-sequence recurrent neural network (RNN), a transformer-based model, a rules-based system, etc. Alternatively, or in addition, the pronunciation resource 512 can perform its text-to-pronunciation mapping function based on a manually-generated lookup table.

According to one rule, the split-validating component 504 concludes that a proposed segmentation is tentatively valid if the combined (e.g., concatenated) pronunciations of its sub-terms are the same as the pronunciation of the compound word as a whole. Based on this rule, for example, the split-validating component 504 will conclude that segmentation of "subscription" into the sub-terms "subscript" and "ion" is invalid. This is because "ion" has a different pronunciation when considered as a separate sub-term, compared to its pronunciation within "subscription." In contrast, the split-validating component 504 will conclude that decomposition of the Indian word "Nehruji" into "Nehru" and "ji" is tentatively valid because "Nehru" and "ji" share the same pronunciation as their counterparts in the compound word "Nehruji." Note that a segmentation is deemed "tentatively" valid because the segmentation may ultimately fail because the segmentation fails to satisfy one or more additional validity tests.

A second resource is made up of one or more language-specific rules 514 that are intended to enforce the linguistic integrity of sub-terms. For example, a subset of rules defines what constitutes an invalid sub-term. In Indian languages, one such rule may specify that no sub-term can commence with a Matra (which is a particular kind of character in Indian languages). A first example 518 in FIG. 5 demonstrates the application of this rule. Another rule may specify that no sub-term can terminate with an halant (which is another particular kind of character in Indian languages). Another language-specific rule for use in Indian languages allows for an extra "ah" presence in the lexicon (codebook) of an original word to account for the schwa deletion rule. A second example 520 in FIG. 5 demonstrates this rule.

FIG. 5 generally indicates that any number of additional resources 516 can be used to test the validity of a segmentation, in addition to the resources described above, and/or as a replacement of one or more of the resources described above. Without limitation, for example, the resources can include a translation resource. The translation resource maps each identified compound term from its given natural language into another natural language, e.g., by converting an Indian word to an English word. For each compound term composed of plural sub-terms, the translation resource forms a phrase by combining the identified sub-terms, with each sub-term separated by its next sub-term (if any) by a white space. The translation resource 414 then maps each such phrase from its given natural language to the other natural language. The split-validating component 504 concludes that a segmentation is tentatively valid if the translation of the compound term is the same as the translation of its corresponding phrase, formed from its sub-terms. For example, the split-validating component 504 may conclude that the proposed segmentation of "subscription" into "sub," "script," and "ion" is not a good segmentation, because the term "subscription" has a translation into German that is not equivalent to the German translation of the phrase formed by the words "sub," "script," and "ion." The translation resource can be implemented using the same kind of technology as the pronunciation resource 512, e.g., as a CNN, RNN, transformer-based neural network, rules-based system, lookup table, etc.

Note that the first resource 512 and the translation resource are language-agnostic because they work well with any natural language, although these resources may be more useful for some natural languages compared to other natural languages. The use of language-agnostic validity tests promotes the scalability of the solution described herein.

In some implementations, the split-validating component 504 makes a final determination that a proposed segmentation is valid if all of its sub-tests return a conclusion of valid. This is a useful provision because a bad match between terms may be affirmed by some sub-tests, but not other sub-tests. In other implementations, the split-validating component 504 can adopt one or more language-specific rules to interpret the results of sub-tests. For example, other implementations can adopt a rule which allows relaxation of the pronunciation sub-test, e.g., by allowing two pronunciations to vary in some regards, but not other regards. In another case, the pronunciation resource 512 establishes that a single term can have two or more possible pronunciations. Here, other implementations can adopt a rule that establishes a match if two terms under comparison share at least one of the established pronunciations. In other implementations, the split-validating component 504 can define two text strings as the same when they map to distributed vectors in vector space within a prescribed distance from each other (e.g., as measured by cosine similarity). Still other relaxations on matching are possible.

Assume that the split-validating component 504 concludes that a proposed segmentation is valid. If so, it adds the proposed segmentation to the training data store 508, e.g., by indicating that sub-terms $W_1$ and $W_2$ are valid components of the compound term $W_C$. On the other hand, assume that the split-validating component 504 concludes that the proposed segmentation is not valid. If so, it does not update the training data store 508 for this segmentation. Instead, the split-validating component 504 discards the proposed segmentation (per processing path 522); it then adds the original compound term $W_C$ to the training data store 508.

Finally, a training component 524 trains the language model 414 based on all of the terms in the training data store 508. The terms will include original terms (that have not been segmented) and sub-terms. Hence, the language model 414 will be configured to detect both integrated compound terms and sub-terms in future input utterances. In some implementations, the training component 524 appends a particular marker code (such as the symbol "+") to each sub-term represented by the language model 414. As will be clarified below, this annotation will alert the ASR system 402 in the inference stage that an identified term may correspond to part of a larger compound word. The training component 524 can generate the language model 414 by computing the normalized frequencies-of-occurrence of the respective terms in training data store 508, within the original training corpus. The training component 524 stores the language model 414 in a model data store 526.

Figure 6:
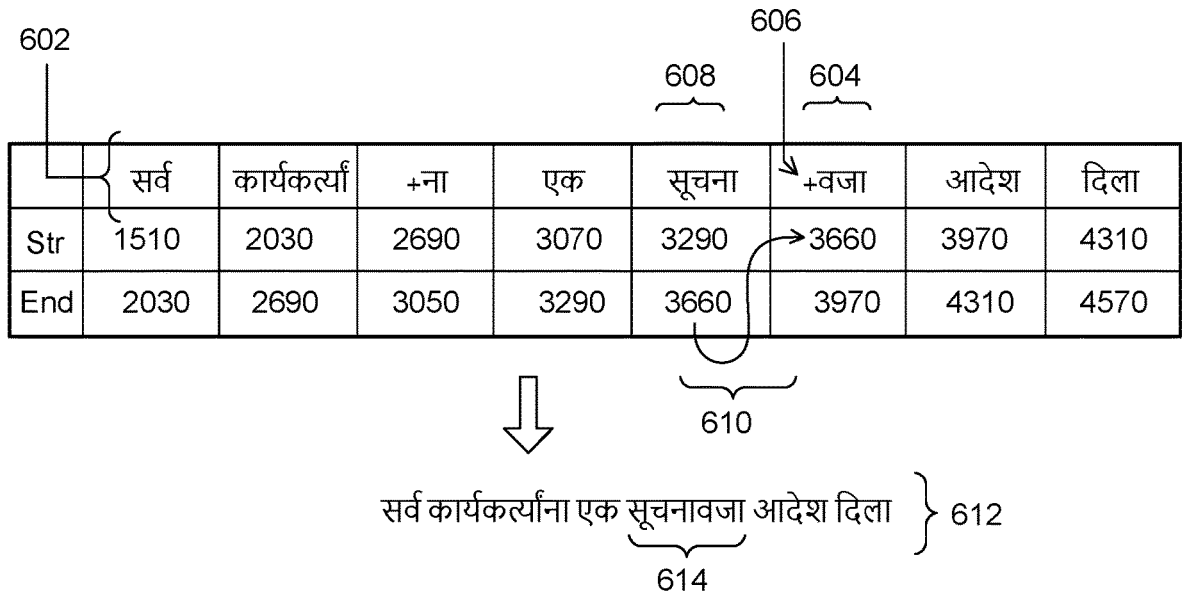
FIGS. 6 and 7 are timing diagrams that demonstrate one manner of operation of a post-processing component of the ASR system, introduced in FIG. 4.
Figure 7:
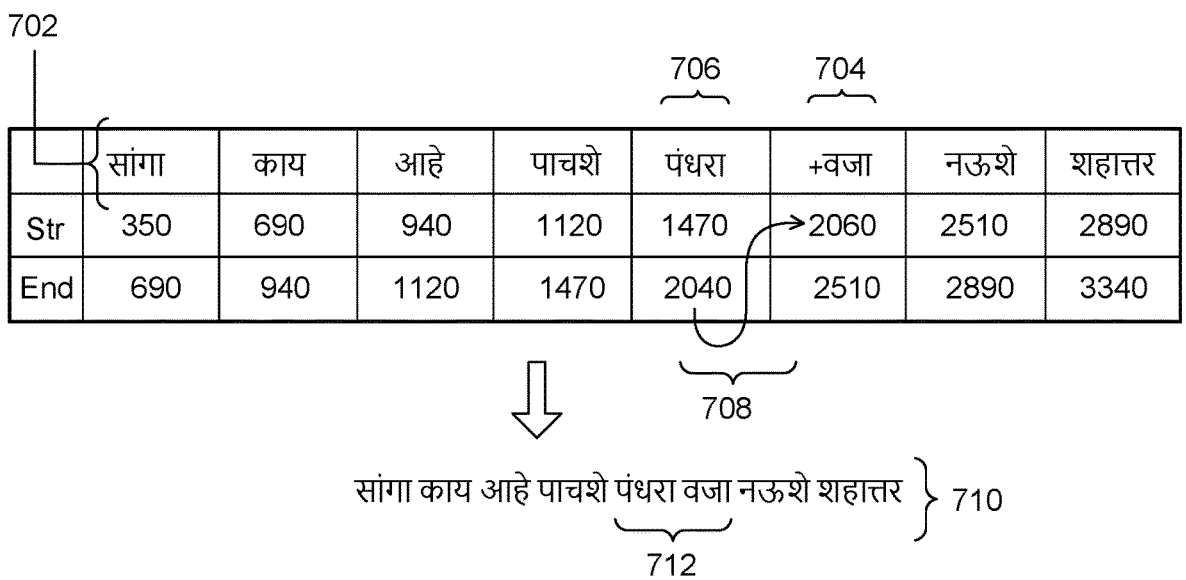

FIGS. 6 and 7 are timing diagrams that demonstrate one manner of operation of the post-processing component 418 of the ASR system 402. More specifically, FIG. 6 shows a first example in which the decoding component 416 of the ASR system 402 produces the preliminary ASR output results 602, the component terms of which are arrayed across the top row of the table shown in FIG. 6. (In this context, a "component term" is generically meant to designate any term in a set of terms of which the ASR output results 602 is composed.) The second row of the table shows the times at which the component terms commenced (or more specifically, the times at which the utterances associated with the component terms commenced). The third row of the table shows the times at which the component terms ended (or more specifically, the times which the utterances associated with the components ended). For example, the table indicates that the utterance associated with the second component term commenced at 2030 milliseconds and ended at 2690 milliseconds. More generally, the times included in FIG. 6 reflect timestamps captured by the ASR system 402 in processing the input utterance.

Note that two of the component terms are annotated with the "+" marker code, to indicate that they are potentially candidates for combination with their preceding component terms. The post-processing component 418 responds to each annotated component term by determining whether its temporal separation from its immediately preceding component term is within a prescribed environment-specific temporal interval. If so, the post-processing component 418 will collapse the annotated component term into its preceding component term, to form a compound term. The post-processing component 418 then generates final ASR output results which includes the compound term instead of its separate sub-terms. In doing so, the post-processing component 418 also removes the "+" marker code.

For example, consider the annotated component term 604 shown in FIG. 6, having the marker code 606 appended thereto. This term is preceded by the component term 608. The amount of time 610 between the annotated component term 604 and the preceding component term 608 is zero. As such, the post-processing component 418 produces final ASR output results 612 including a compound term 614 that is formed by combining the annotated compound term 604 with its preceding component term 608.

FIG. 7 shows another example in which the preliminary ASR output results 702 includes an annotated component term 704 that is preceded by another component term 706. In this case, however, the amount of time 708 between the annotated component term 704 and its preceding component term 706 is 20 milliseconds. Assume that 20 milliseconds is greater than the permitted interval of time. In response to this finding, the post-processing component 418 produces final ASR output results 710 in which the annotated component term 704 is not combined with its preceding component term 706, which is illustrated by the pair of terms 712 shown in the final ASR output results 710. The post-processing component 418 also removes the marker code "+" from the ASR output results 710 prior to presenting it to the user.

Other implementations of the ASR system 402 need not display the ASR output results to the user. For example, as noted above, the ASR system 402 may be a component of a larger system. The larger system passes the normalized ASR output results to one or more downstream components (not shown) of the larger system.

Note that the language model 414 can represent the same text string as a standalone term and as a sub-term that may be part of one or more compound terms. For example, the language model 414 can include the word "phone" to account for those contexts in which the word "phone" is used as a standalone word, e.g., as in, "Tell your brother to pick up the phone when his mother calls." The same language model 414 can include the sub-term "+phone" to account for those occasions when this text stream appears as a sub-term in a compound term, such as "speakerphone," "smartphone," etc. The decoding component 416 will probe its search space to identify which use of "phone" is most probable, given the context of a particular utterance as a whole. This processing will determine whether the preliminary ASR output results will include the standalone word "phone" or the sub-term "+phone."

In conclusion to Section A, the training system 404 is technically advantageous because it builds a language model 414 that reduces the occurrence of out-of-vocabulary terms. The language model 414 accomplishes this goal because it can successfully interpret a never-encountered compound term based on the successful detection of the sub-terms that compose it. In other words, this aspect of the language model 414 reduces the kind of problems demonstrated in the example of FIG. 2.

More generally stated, the ASR system 402 is able to successfully reconstruct compound terms from their sub-terms because the language model 414 provides an accurate representation of the respective frequencies-of-occurrence of the sub-terms across the training corpus, including the occurrences of sub-terms that appear in compound terms. The ASR system 402 also penalizes the formation of incorrect compound terms due to the influence of the validating tests applied by the training system 404. This enables the ASR system 402 to provide superior performance compared to a language model that is built based on the output of the segmenting component 502, without the subsequent validity testing.

The training system 404 also facilitates the production of a compact language model 414, which is stored in the model data store 526. The language model 414 is compact because it need not separately account for many compound words as integral wholes. By reducing the size of the language model 414, the ASR system 402 can decrease the amount of computing resources (e.g., memory, processor resources, etc.) required to operate on the language model 414.

The post-processing component 418 of the ASR system 402 also improves the quality of the ASR output results, e.g., by combining sub-terms that are best represented as compound terms. The enhanced-quality ASR output results facilitate the user's interaction with the ASR system 402. In other words, this behavior reduces the kind of problems demonstrated in the example of FIG. 3. This manner of operation also improves the performance of any downstream component that consumes the ASR output results.

The training system 404 can also generate the language model 414 in an efficient manner. This is because some of the signals that are used to determine the validity of a segmentation originate from existing general-purpose machine-trained models (such as general-purpose pronunciation models, etc.). Reliance on these preexisting models constitutes supervision-by-proxy, and eliminates the burdensome need for the developer to generate a handcrafted training set, from which a custom classification model is derived. More formally stated, the training system 404 determines whether the segmentation of an original term into the two or more sub-terms is a valid segmentation based on two or more validity tests, and based on the use of at least one general-purpose machine-trained model that has been developed to serve plural functions other than determining validity of segmentation, or at least functions that are not limited to determining validity of segmentation. A pronunciation resource is an example of a general-purpose machine-trained model that is built to operate in any application that requires the determination of the pronunciation of a word or word part, not limited to the particular validation processes described herein.

Still further, the training system 404 also incorporates some validity tests that are applicable to any natural language. This factor establishes the scalability of the solution described herein to different language environments. Note that the training system 404 of FIG. 5 may include some language-specific rules specified by a developer, but the overall design of the training system 404 reduces the need for such handcrafted rules.

The principles described above have been framed in the context of building a vocabulary of terms that is subsequently used to train the language model 414 of the ASR system 402. The same principles can be used to produce a training set for use in training other types of natural language processing (NLP) models, such as machine-trained translation models, sentiment analysis models, etc. Some of these NLP models may include the contribution of a language model as just one part of a larger whole, rather than as a discrete resource.

B. Illustrative Processes

Figure 8:
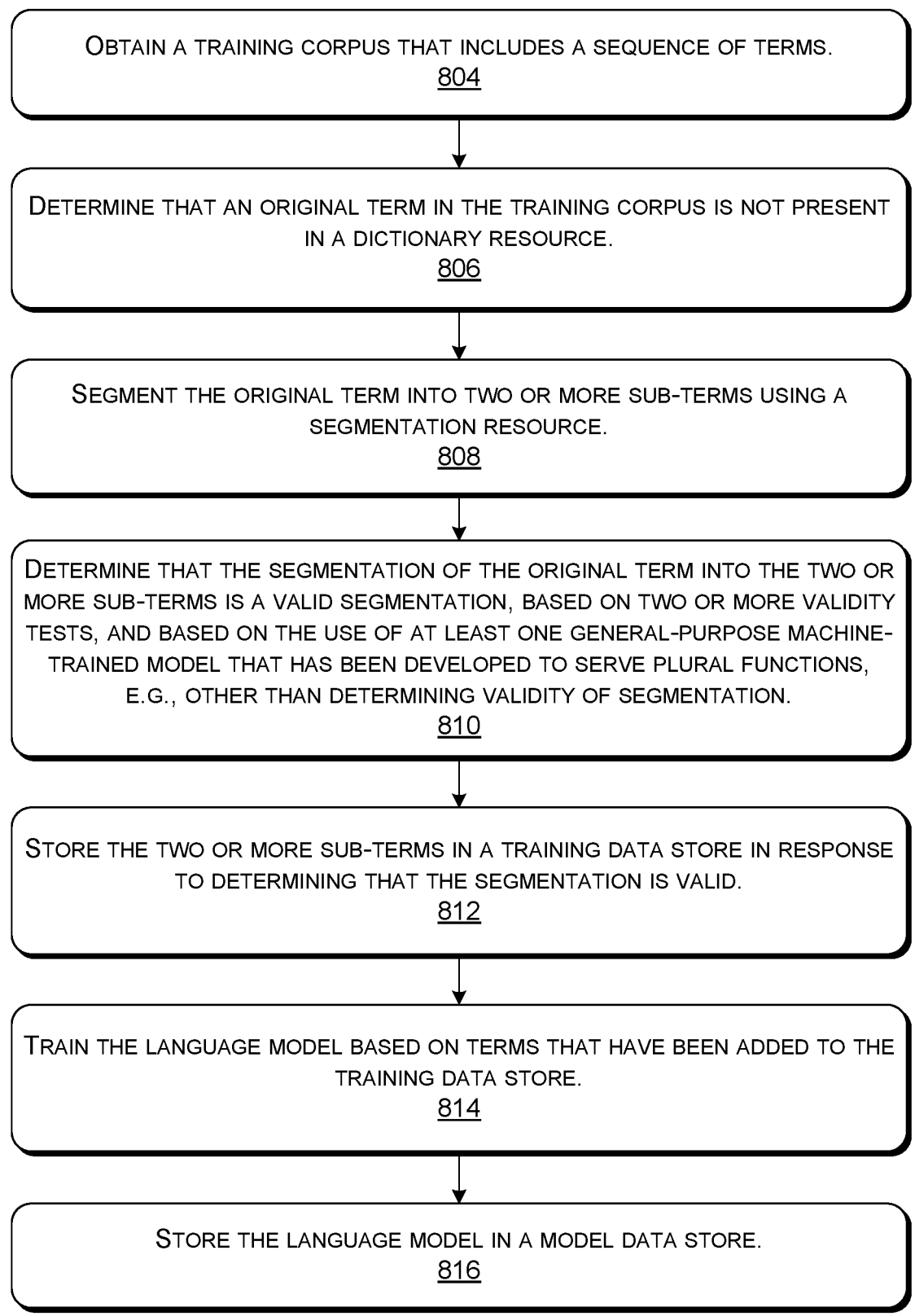
FIG. 8 is a flowchart that describes one manner of operation of the training system of FIG. 5.
Figure 9:
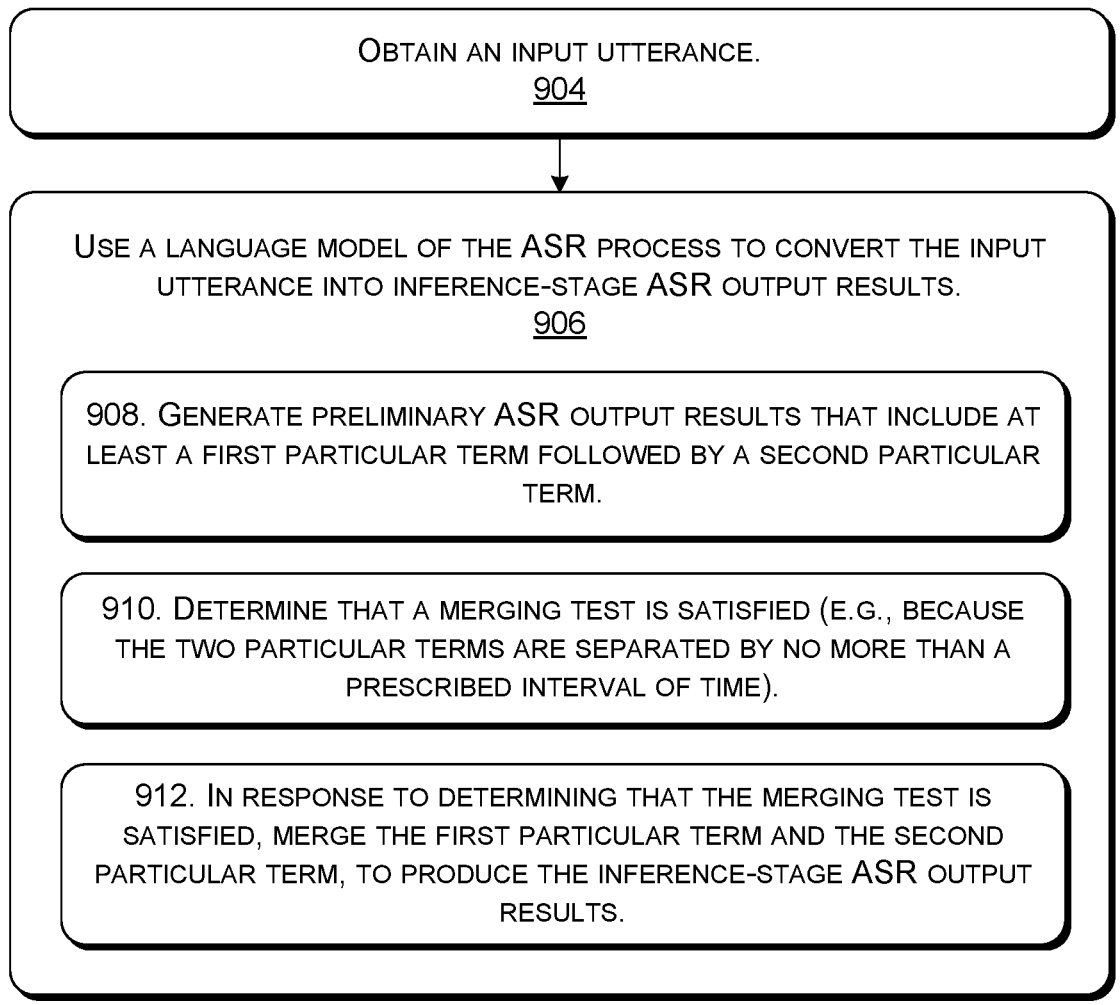
FIG. 9 is a flowchart that describes one manner of operation of the post-processing component.

FIGS. 8 and 9 show processes that explain the operation of the computing systems of Section A in flowchart form. Since the principles underlying the operation of these computing systems have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

More specifically, FIG. 8 shows a process 802 performed by the training system 404 for producing the language model 414 for use in the automatic speech recognition (ASR) system 402. In block 804, the training system 404 obtains a training corpus that includes a sequence of terms. In block 806, the training system 404 determines that an original term in the training corpus is not present in the dictionary resource 506. In block 808, the training system 404 segments the original term into two or more sub-terms using a segmentation resource (e.g., the segmenting component 502). In block 810, the training system 404 determines that the segmentation of the original term into the two or more sub-terms is a valid segmentation, based on two or more validity tests, and based on the use of at least one general-purpose machine-trained model that has been developed to serve plural functions, e.g., other than determining validity of segmentation, or at least not limited to determining validity of segmentation. In block 812, the training system 404 stores the two or more sub-terms in the training data store 508 in response to determining that the segmentation is valid. In block 814, the training system 404 trains the language model 412 based on terms that have been added to the training data store 508. In block 816, the training system 404 stores the language model 412 in the model data store 526.

FIG. 9 shows a process 902 for performing an automatic speech recognition (ASR) process. In block 904, the ASR system 402 obtains an input utterance. In block 906, the ASR system 402 uses the language model 414 of the ASR process to convert the input utterance into inference-stage ASR output results, the language model 414 being produced by the training process set forth in FIG. 8.

More specifically, in block 908, the ASR system 402 generates preliminary ASR output results that include at least a first particular term followed by a second particular term. In block 910, the ASR system 402 determines that a merging test is satisfied (e.g., because the second particular term follows the first particular term by no more than prescribed amount of time). In block 912, in response to determining that the merging test is satisfied, the ASR system 402 merges the first particular term and the second particular term, to produce the inference-stage ASR output results.

C. Representative Computing Functionality

Figure 10:
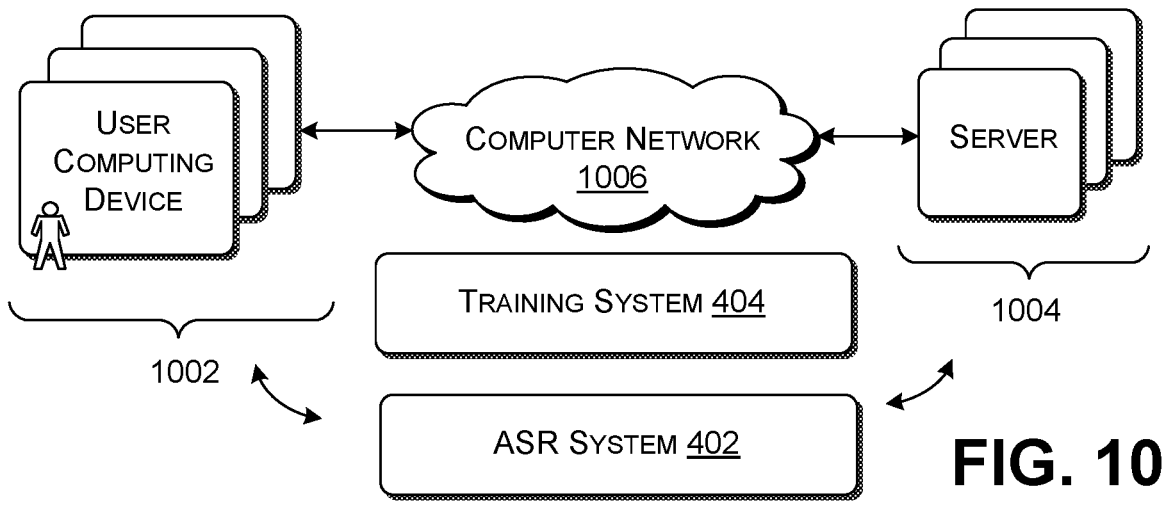
FIG. 10 shows computing equipment that can be used to implement the systems shown in FIG. 1.

FIG. 10 shows an example of computing equipment that can be used to implement any of the systems summarized above. The computing equipment includes a set of user computing devices 1002 coupled to a set of servers 1004 via a computer network 1006. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1006 can be implemented as a local area network, a wide area network (e.g., the Internet), one or more point-to-point links, or any combination thereof.

FIG. 10 also indicates that the ASR system 402 and the training system 404 can be spread across the user computing devices 1002 and/or the servers 1004 in any manner. For instance, in one case, the ASR system 402 is entirely implemented by one or more of the servers 1004. Each user may interact with the servers 1004 via a browser application or other programmatic interface provided by a user computing device. In another case, the ASR system 402 is entirely implemented by a user computing device in local fashion, in which case no interaction with the servers 1004 is necessary. In another case, the functionality associated with the ASR system 402 is distributed between the servers 1004 and each user computing device in any manner.

Figure 11:
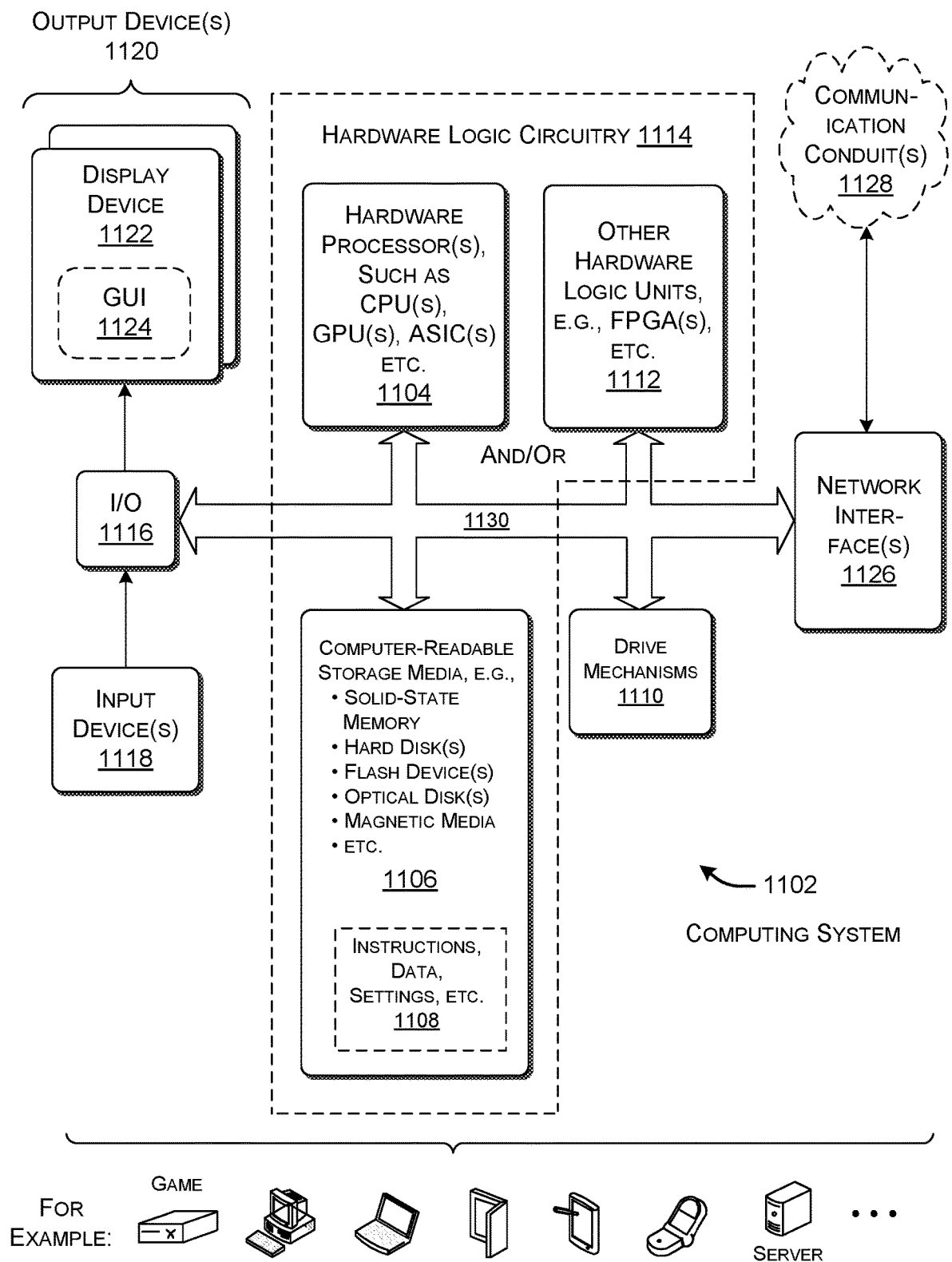
FIG. 11 shows an illustrative type of computing system that can be used to implement any aspect of the features shown in the foregoing drawings.

FIG. 11 shows a computing system 1102 that can be used to implement any aspect of the mechanisms set forth in the above-described figures. For instance, the type of computing system 1102 shown in FIG. 11 can be used to implement any user computing device or any server shown in FIG. 10. In all cases, the computing system 1102 represents a physical and tangible processing mechanism.

The computing system 1102 can include one or more hardware processors 1104. The hardware processor(s) 1104 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing system 1102 can also include computer-readable storage media 1106, corresponding to one or more computer-readable media hardware units. The computer-readable storage media 1106 retains any kind of information 1108, such as machine-readable instructions, settings, data, etc. Without limitation, the computer-readable storage media 1106 may include one or more solid-state devices, one or more magnetic hard disks, one or more optical disks, magnetic tape, and so on. Any instance of the computer-readable storage media 1106 can use any technology for storing and retrieving information. Further, any instance of the computer-readable storage media 1106 may represent a fixed or removable unit of the computing system 1102. Further, any instance of the computer-readable storage media 1106 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 1102 can utilize any instance of the computer-readable storage media 1106 in different ways. For example, any instance of the computer-readable storage media 1106 may represent a hardware memory unit (such as Random Access Memory (RAM)) for storing transient information during execution of a program by the computing system 1102, and/or a hardware storage unit (such as a hard disk) for retaining/archiving information on a more permanent basis. In the latter case, the computing system 1102 also includes one or more drive mechanisms 1110 (such as a hard drive mechanism) for storing and retrieving information from an instance of the computer-readable storage media 1106.

The computing system 1102 may perform any of the functions described above when the hardware processor(s) 1104 carry out computer-readable instructions stored in any instance of the computer-readable storage media 1106. For instance, the computing system 1102 may carry out computer-readable instructions to perform each block of the processes described in Section B.

Alternatively, or in addition, the computing system 1102 may rely on one or more other hardware logic units 1112 to perform operations using a task-specific collection of logic gates. For instance, the hardware logic unit(s) 1112 may include a fixed configuration of hardware logic gates, e.g., that are created and set at the time of manufacture, and thereafter unalterable. Alternatively, or in addition, the other hardware logic unit(s) 1112 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 11 generally indicates that hardware logic circuitry 1114 includes any combination of the hardware processor(s) 1104, the computer-readable storage media 1106, and/or the other hardware logic unit(s) 1112. That is, the computing system 1102 can employ any combination of the hardware processor(s) 1104 that execute machine-readable instructions provided in the computer-readable storage media 1106, and/or one or more other hardware logic unit(s) 1112 that perform operations using a fixed and/or programmable collection of hardware logic gates. More generally stated, the hardware logic circuitry 1114 corresponds to one or more hardware logic units of any type(s) that perform operations based on logic stored in and/or otherwise embodied in the hardware logic unit(s). Further, in some contexts, each of the terms "component," "module," "engine," "system," and "tool" refers to a part of the hardware logic circuitry 1114 that performs a particular function or combination of functions.

In some cases (e.g., in the case in which the computing system 1102 represents a user computing device), the computing system 1102 also includes an input/output interface 1116 for receiving various inputs (via input devices 1118), and for providing various outputs (via output devices 1120). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 1122 and an associated graphical user interface presentation (GUI) 1124. The display device 1122 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1102 can also include one or more network interfaces 1126 for exchanging data with other devices via one or more communication conduits 1128. One or more communication buses 1030 communicatively couple the above-described units together.

The communication conduit(s) 1128 can be implemented in any manner, e.g., by a local area computer network, a wide area computer network (e.g., the Internet), point-to-point connections, etc., or any combination thereof. The communication conduit(s) 1128 can include any combination of hardwired links, wireless links, routers, gateway functionality, name servers, etc., governed by any protocol or combination of protocols.

FIG. 11 shows the computing system 1102 as being composed of a discrete collection of separate units. In some cases, the collection of units corresponds to discrete hardware units provided in a computing device chassis having any form factor. FIG. 11 shows illustrative form factors in its bottom portion. In other cases, the computing system 1102 can include a hardware logic unit that integrates the functions of two or more of the units shown in FIG. 1. For instance, the computing system 1102 can include a system on a chip (SoC or SOC), corresponding to an integrated circuit that combines the functions of two or more of the units shown in FIG. 11.

The following summary provides a non-exhaustive set of illustrative examples of the technology set forth herein.

(A1) According to a first aspect, some implementations of the technology described herein include a method (e.g., the process 802) for producing a language model (e.g., the language model 414) for use in an automatic speech recognition (ASR) system (e.g., the ASR system 402). The method includes: obtaining (e.g., 804) a training corpus that includes a sequence of terms; determining (e.g., 806) that an original term in the training corpus is not present in a dictionary resource (e.g., 506); segmenting (e.g., 808) the original term into two or more sub-terms using a segmentation resource (e.g., 502); determining (e.g., 810) that the segmentation of the original term into the two or more sub-terms is a valid segmentation, based on two or more validity tests, and based on the use of at least one machine-trained model that has, optionally, been developed to serve plural functions, e.g., other than determining validity of segmentation; storing (e.g., 812) the two or more sub-terms in a training data store (e.g., 508) in response to determining that the segmentation is valid; training (e.g., 814) the language model based on terms that have been added to the training data store; and storing (e.g., 816) the language model in a model data store (e.g., 526).

The method of A1 achieves at least some of the technical benefits described at the close of Section A. For example, the use of at least one general-purpose machine-trained model to determine the validity of segmentations increases the efficiency by which the method trains the language model. This is because the developer is freed from the labor-intensive, time-intensive, and error-prone process of developing a custom machine-trained model that is specifically designed to determine the validity of segmentations. Further, the method can produce a compact language model for storage in the model data store due to the fact that the language model can efficiently account for many compound words without storing these words in their integrated (compound) forms. A compact language model reduces the amount of storage space required to store it, and the amount of processing resources required to interact with it.

(A2) According to some implementations of the method of A1, the method further includes: for another original term in the training corpus, determining that the other original term is present in the dictionary resource; and storing the other original term in the training data store without segmenting it and applying the two or more validity tests.

(A3) According to some implementations of the method of any of A1 and A2, one validity test involves: determining a pronunciation of the original term using a pronunciation resource; and determining pronunciations of the two or more sub-terms using the pronunciation resource. The pronunciation of the original term matching the pronunciations of the two or more sub-terms, when combined, constitutes evidence that the segmentation is valid.

(A4) According to some implementations of the method of any of A1-A3, one validity test determines whether the segmentation satisfies at least one language-specific rule.

(A5) According to some implementations of the method of A4, one language-specific rule specifies that no sub-term can begin with a specified character, and/or can end with another specified character.

(A6) According to some implementations of the method of any of A1-A5, the method involves appending a marker code to each sub-term for which segmentation has been deemed valid.

(A7) According to some implementations of the method of any of A1-A6, the method further includes applying the ASR system by: obtaining an input utterance; and using the language model of the ASR system to convert the input utterance into inference-stage ASR output results. The operation of using the language model includes: generating preliminary ASR output results that include at least a first particular term followed by a second particular term; determining that a merging test is satisfied; and in response to determining that the merging test is satisfied, merging the first particular term and the second particular term, to produce the inference-stage ASR output results.

(A8) According to some implementations of the method of A7, the merging test determines that the second particular term occurs within a prescribed interval of time following the first particular term.

(A9) According to some implementations of the method of any of A7-A9, the second particular term has a marker code appended to it to indicate that it is a sub-term candidate for combining with the first particular term.

(A10) According to a second aspect, some implementations of the technology described herein include a computing system (e.g., the computing system 1102) having the language model produced using any of the methods of A1-A9.

(B1) According to a third aspect, some implementations of the technology described herein include a method (e.g., the process 902) for applying an automatic speech recognition (ASR) process. The method includes obtaining (e.g., 904) an input utterance; and using (e.g., 906) a language model (e.g., 414) of the ASR process to convert the input utterance into inference-stage ASR output results. The language model is produced in a preceding training process (e.g., 802) that involves: obtaining (e.g., 804) a training corpus that includes a sequence of terms; determining (e.g., 806) that an original term in the training corpus is not present in a dictionary resource (e.g., 506); segmenting (e.g., 808) the original term into two or more term sub-terms using a segmentation resource (e.g., 502); determining (e.g., 810) that the segmentation of the original term into the two or more sub-terms is a valid segmentation, based on two or more validity tests, and based on the use of at least one machine-trained model that has been developed to serve plural functions, e.g., other than determining validity of segmentation; storing (e.g., 812) the two or more sub-terms in a training data store (e.g., 508) in response to determining that the segmentation is valid; training (e.g., 814) the language model based on terms that have been added to the training data store; and storing (e.g., 816) the language model in a model data store (e.g., 526). The method achieves at least some of the technical benefits described above for the method of A1.

(B2) According to some implementations of the method of B1, one validity test involves: determining a pronunciation of the original term using a pronunciation resource; and determining pronunciations of the two or more sub-terms using the pronunciation resource. The pronunciation of the original term matching the pronunciations of the two or more sub-terms, when combined, constitutes evidence that the segmentation is valid.

(B3) According to some implementations of the method of any of B1 and B2, the method further includes appending a marker code to each sub-term for which segmentation has been deemed valid.

(B4) According to some implementations of the method of any of B1-B3, the operation of using the language model includes: generating preliminary ASR output results that include at least a first particular term followed by a second particular term; determining that a merging test is satisfied; and in response to determining that the merging test is satisfied, merging the first particular term and the second particular term, to produce the inference-stage ASR output results.

(B5) According to some implementations of the method of B4, the merging test determines that the second particular term occurs within a prescribed interval of time following the first particular term.

(B6) According to some implementations of the method of any of B4-B6, the second particular term has a marker code appended to it to indicate that it is a sub-term candidate for combining with the first particular term.

In yet another aspect, some implementations of the technology described herein include a computing system (e.g., computing system 1102) that includes hardware logic circuitry (e.g., 1114) that is configured to perform any of the methods described herein (e.g., any individual method of the methods A1-A9 and B1-B6).

In yet another aspect, some implementations of the technology described herein include a computer-readable storage medium (e.g., 1106) for storing computer-readable instructions (e.g., 1108). The computer-readable instructions, when executed by one or more hardware processors (e.g., 1104), perform any of the methods described herein (e.g., any individual method of the methods A1-A9 and B1-B6).

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuity 1114 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for producing a language model for use in an automatic speech recognition (ASR) system, comprising:
    obtaining a training corpus that includes a sequence of terms;
    determining that an original term in the training corpus is not present in a dictionary resource;
    segmenting the original term into two or more sub-terms using a segmentation resource;
    determining that the segmentation of the original term into the two or more sub-terms is a valid segmentation, based on two or more validity tests, and based on use of at least one machine-trained model that has been developed to serve plural functions;
    storing the two or more sub-terms in a training data store in response to determining that the segmentation is valid;
    training the language model based on terms that have been added to the training data store; and
    storing the language model in a model data store.

2. The computer-implemented method of claim 1, wherein the method further includes:
    for another original term in the training corpus, determining that the other original term is present in the dictionary resource; and
    storing the other original term in the training data store without segmenting it and applying the two or more validity tests.

3. The computer-implemented method of claim 1, wherein one validity test involves:
    determining a pronunciation of the original term using a pronunciation resource; and determining pronunciations of the two or more sub-terms using the pronunciation resource, wherein the pronunciation of the original term matching the pronunciations of the two or more sub-terms, when combined, constitutes evidence that the segmentation is valid.

4. The computer-implemented method of claim 1, wherein one validity test determines whether the segmentation satisfies at least one language-specific rule.

5. The computer-implemented method of claim 4, wherein one language-specific rule specifies that no sub-term can begin with a specified character, and/or can end with another specified character.

6. The computer-implemented method of claim 1, wherein the method involves appending a marker code to each sub-term for which segmentation has been deemed valid.

7. The computer-implemented method of claim 1, further comprising applying the ASR system by:
obtaining an input utterance; and
using the language model of the ASR system to convert the input utterance into inference-stage ASR output results,
said using the language model including:
generating preliminary ASR output results that include at least a first particular term followed by a second particular term;
determining that a merging test is satisfied; and
in response to determining that the merging test is satisfied, merging the first particular term and the second particular term, to produce the inference-stage ASR output results.

8. The computer-implemented method of claim 7, wherein the merging test determines that the second particular term occurs within a prescribed interval of time following the first particular term.

9. The computer-implemented method of claim 7, wherein the second particular term has a marker code appended to it to indicate that it is a sub-term candidate for combining with the first particular term.

10. A computing system for producing a language model for use in an automatic speech recognition (ASR) system, comprising:
hardware logic circuitry for performing operations, the hardware logic circuitry corresponding to: (a) one or more hardware processors that execute machine-readable instructions stored in a memory, and/or (b) one or more other hardware logic units that include a collection of logic gates, the operations including:
obtaining a training corpus that includes a sequence of terms;
determining that an original term in the training corpus is not present in a dictionary resource;
segmenting the original term into two or more sub-terms using a segmentation resource;
determining that the segmentation of the original term into the two or more sub-terms is a valid segmentation, based on two or more validity tests, and based on use of at least one machine-trained model that has been developed to serve plural functions;
storing the two or more sub-terms in a training data store in response to determining that the segmentation is valid;
training the language model based on terms that have been added to the training data store; and
storing the language model in a model data store.

11. A computing system for applying an automatic speech recognition (ASR) process, comprising:
hardware logic circuitry for performing operations, the hardware logic circuitry corresponding to: (a) one or more hardware processors that execute machine-readable instructions stored in a memory, and/or (b) one or more other hardware logic units that include a collection of logic gates, the operations including:
obtaining an input utterance; and
using a language model of the ASR process to convert the input utterance into inference-stage ASR output results,
the language model being produced in a preceding training process that involves:
obtaining a training corpus that includes a sequence of terms;
determining that an original term in the training corpus is not present in a dictionary resource;
segmenting the original term into two or more term sub-terms using a segmentation resource;
determining that the segmentation of the original term into the two or more sub-terms is a valid segmentation, based on two or more validity tests, and based on the use of at least one machine-trained model that has been developed to serve plural functions;
storing the two or more sub-terms in a training data store in response to determining that the segmentation is valid;
training the language model based on terms that have been added to the training data store; and
storing the language model in a model data store.

12. The computing system of claim 11, wherein one validity test involves:
determining a pronunciation of the original term using a pronunciation resource; and
determining pronunciations of the two or more sub-terms using the pronunciation resource,
wherein the pronunciation of the original term matching the pronunciations of the two or more sub-terms, when combined, constitutes evidence that the segmentation is valid.

13. The computing system of claim 11, wherein the operations further include appending a marker code to each sub-term for which segmentation has been deemed valid.

14. The computing system of claim 11, wherein said using the language model includes:
generating preliminary ASR output results that include at least a first particular term followed by a second particular term;
determining that a merging test is satisfied; and
in response to determining that the merging test is satisfied, merging the first particular term and the second particular term, to produce the inference-stage ASR output results.

15. The computing system of claim 14, wherein the merging test determines that the second particular term occurs within a prescribed interval of time following the first particular term.

16. The computing system of claim 14, wherein the second particular term has a marker code appended to it to indicate that it is a sub-term candidate for combining with the first particular term.

17. A non-transitory computer-readable storage medium for storing computer-readable instructions, the computer-readable instructions, when executed by one or more hardware processors, performing a method that comprises:
obtaining a training corpus that includes a sequence of terms;

determining that an original term in the training corpus is not present in a dictionary resource;

segmenting the original term into two or more sub-terms using a segmentation resource;

determining that the segmentation of the original term into the two or more sub-terms is a valid segmentation, based on two or more validity tests, and based on the use of at least one machine-trained model that has been developed to serve plural functions;

storing the two or more sub-terms in a training data store in response to determining that the segmentation is valid;

training a language model of an automatic speech recognition (ASR) system based on terms that have been added to the training data store; and storing the language model in a model data store, wherein one validity test involves: determining a pronunciation of the original term using a pronunciation resource; determining pronunciations of the two or more sub-terms using the pronunciation resource; and determining whether the pronunciation of the original term matches the pronunciations of the two or more sub-terms, when combined, and wherein another validity test involves determining whether the segmentation satisfies at least one language-specific rule.

18. The computer-readable storage medium of claim 17, wherein the operations further include:

obtaining an input utterance; and generating preliminary ASR output results using the language model that include at least a first particular term followed by a second particular term;

determining that a merging test is satisfied; and in response to said determining that the merging test is satisfied, merging the first particular term and the second particular term, to produce inference-stage ASR output results.

19. The computer-readable storage medium of claim 18, wherein the merging test determines that the second particular term occurs within a prescribed interval of time following the first particular term.

20. The computer-readable storage medium of claim 18, wherein the second particular term has a marker code appended to it to indicate that it is a sub-term candidate for combining with the first particular term.

* * * * *